(12) United States Patent
Roulet et al.

(10) Patent No.: US 10,694,102 B2
(45) Date of Patent: Jun. 23, 2020

(54) METHOD TO CAPTURE, STORE, DISTRIBUTE, SHARE, STREAM AND DISPLAY PANORAMIC IMAGE OR VIDEO

(71) Applicant: 6115187 Canada, Montreal (CA)

(72) Inventors: Patrice Roulet, Montreal (CA); Xiaojun Du, Montreal (CA); Pierre Konen, Saint-Bruno (CA); Simon Thibault, Quebec City (CA); Jocelyn Parent, Montreal (CA); Pascale Nini, Montreal (CA); Alessandro Gasparini, Montreal (CA); Valentin Bataille, Montreal (CA); Jhinseok Lee, Montreal (CA)

(73) Assignee: ImmerVision, Inc., Montreal, Quebec (CA)

( * ) Notice: Subject to any disclaimer, the term of this patent is extended or adjusted under 35 U.S.C. 154(b) by 121 days.

(21) Appl. No.: 15/656,647

(22) Filed: Jul. 21, 2017

(65) Prior Publication Data

US 2018/0027181 A1    Jan. 25, 2018

Related U.S. Application Data

(60) Provisional application No. 62/365,535, filed on Jul. 22, 2016.

(51) Int. Cl.
*H04N 5/232* (2006.01)
*G03B 37/00* (2006.01)
(Continued)

(52) U.S. Cl.
CPC ......... *H04N 5/23238* (2013.01); *G03B 37/00* (2013.01); *G03B 37/04* (2013.01); *G06T 5/002* (2013.01); *H04N 5/2253* (2013.01); *H04N 5/2257* (2013.01); *H04N 5/2258* (2013.01); *H04N 5/23293* (2013.01); *H04N 5/247* (2013.01); *H04N 5/2628* (2013.01)

(58) Field of Classification Search
CPC .................................................. H04N 5/23238
USPC ........................................................... 348/38
See application file for complete search history.

(56) References Cited

U.S. PATENT DOCUMENTS

| 6,002,430 A | 12/1999 | McCall et al. |
| 6,795,113 B1 | 9/2004 | Jackson et al. |
| (Continued) | | |

FOREIGN PATENT DOCUMENTS

| EP | 2031561 A1 | 3/2009 |
| EP | 1909226 B1 | 6/2012 |

OTHER PUBLICATIONS

Office Action dated Sep. 18, 2019 in U.S. Appl. No. 15/656,707.

*Primary Examiner* — Yulin Sun
(74) *Attorney, Agent, or Firm* — Panitch Schwarze Belisario & Nadel LLP

(57) ABSTRACT

The present invention is a system for capturing and assembling panoramic image data having a panoramic image capture device with image assembly parameters and configured to capture image content data, an encoding device coupled to the panoramic image capture device and configured to combine the image content data and the image assembly parameters into a panoramic image file, and a decoding device configured to receive the panoramic image file and assemble, based on the image assembly parameters, at least a portion of the image content data into an output image.

20 Claims, 11 Drawing Sheets

(51) Int. Cl.
*H04N 5/225* (2006.01)
*H04N 5/247* (2006.01)
*H04N 5/262* (2006.01)
*G03B 37/04* (2006.01)
*G06T 5/00* (2006.01)

(56) References Cited

U.S. PATENT DOCUMENTS

| | | |
|---|---|---|
| 8,730,299 B1 | 5/2014 | Kozko |
| 9,686,466 B1 | 6/2017 | Billinghurst et al. |
| 9,854,164 B1 | 12/2017 | Kozko et al. |
| 2004/0100443 A1 | 5/2004 | Mandelbaum et al. |
| 2011/0216159 A1* | 9/2011 | Yoshizumi ............. H04N 5/225 348/36 |
| 2015/0062363 A1 | 3/2015 | Takenaka et al. |
| 2015/0281507 A1* | 10/2015 | Konen ................. H04N 1/2112 348/231.6 |
| 2016/0012855 A1 | 1/2016 | Krishnan |
| 2017/0132757 A1* | 5/2017 | Thiebaud ............. G02B 27/017 |
| 2017/0339392 A1 | 11/2017 | Forutanpour et al. |
| 2019/0028693 A1* | 1/2019 | Yu ........................... G06T 7/74 |

* cited by examiner

Figure 1:
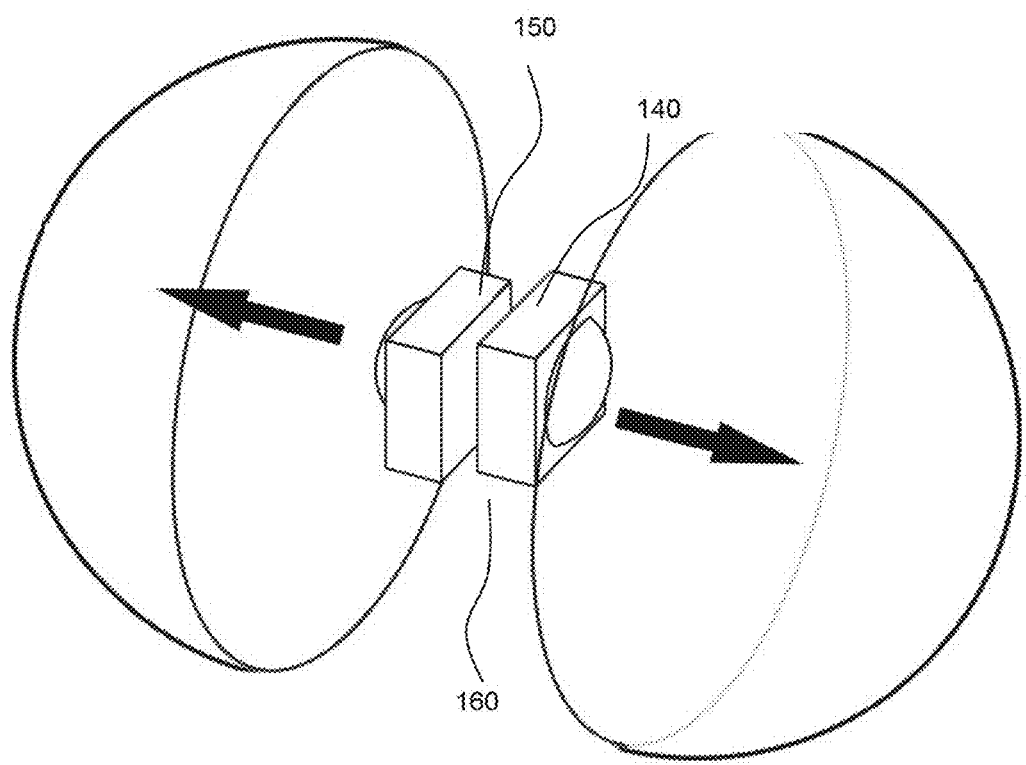
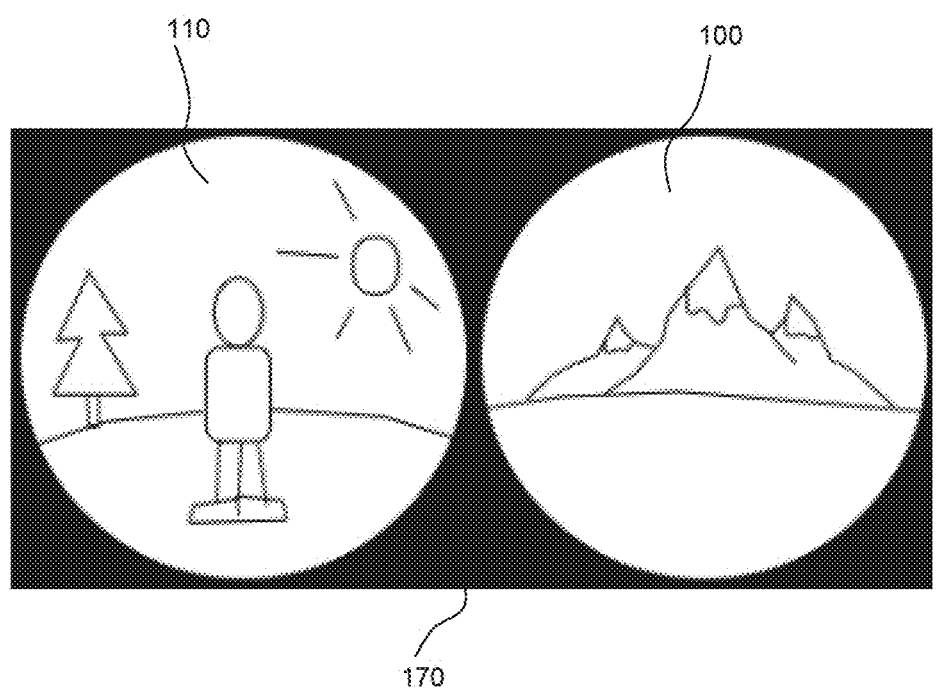

Fig. 4A
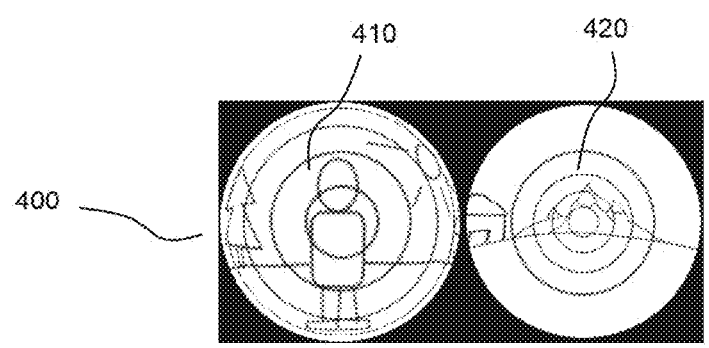
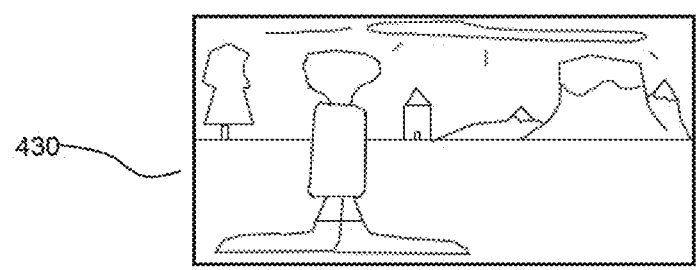
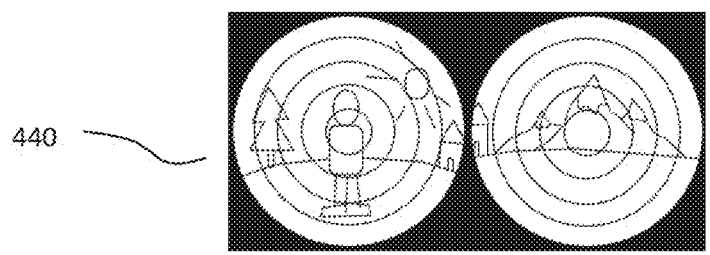

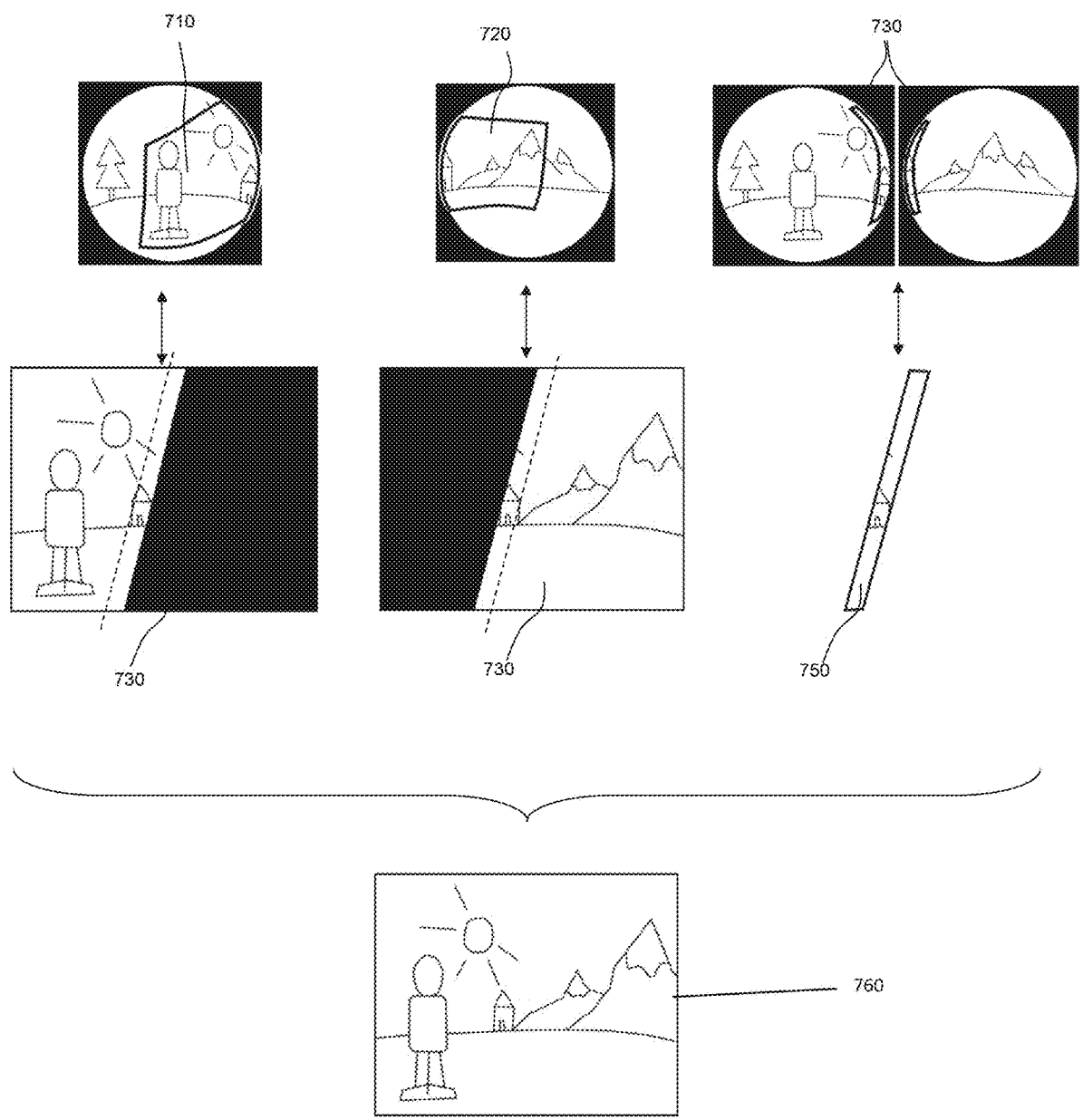

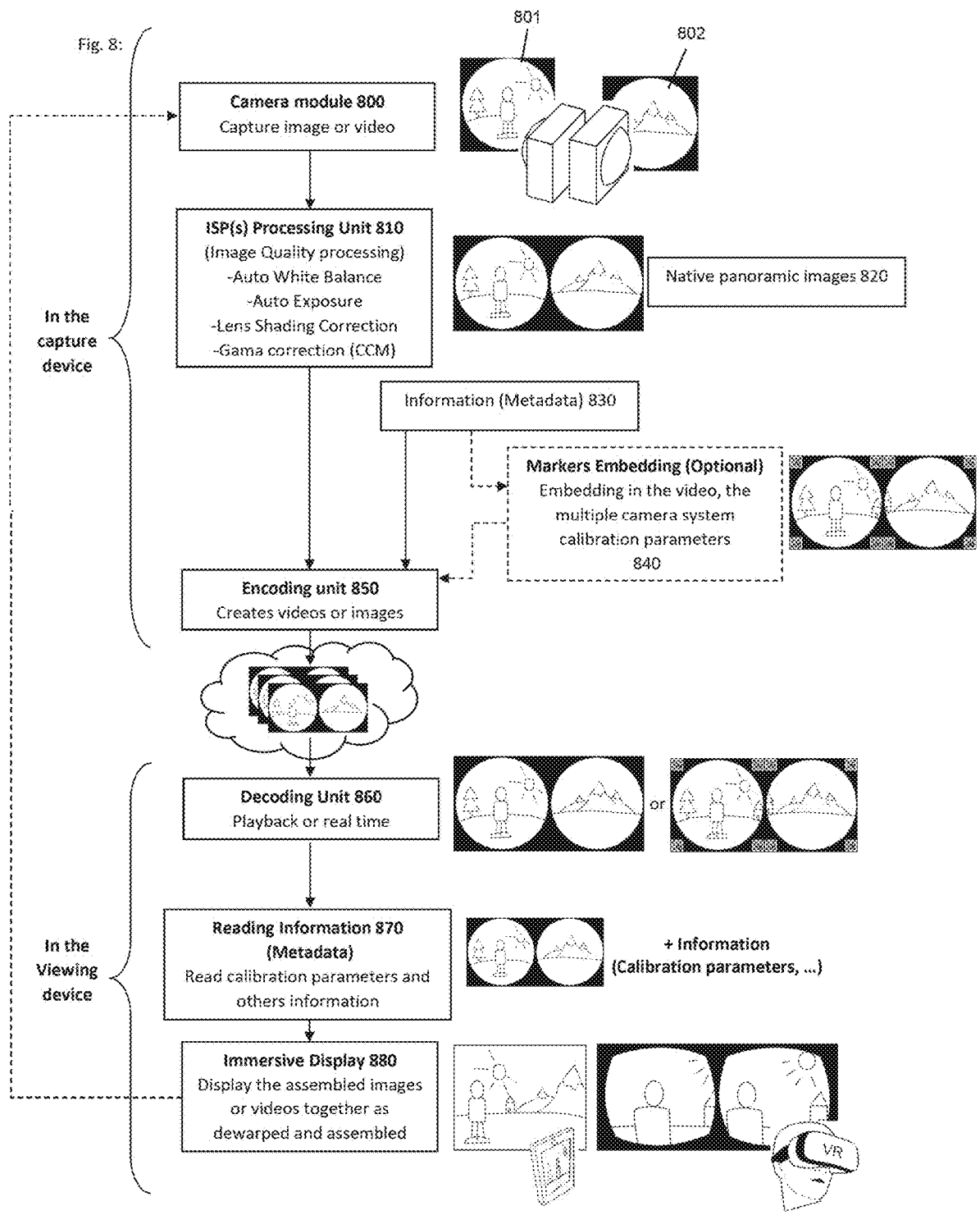

METHOD TO CAPTURE, STORE, DISTRIBUTE, SHARE, STREAM AND DISPLAY PANORAMIC IMAGE OR VIDEO

CROSS-REFERENCE TO RELATED APPLICATIONS

The present application claims the benefit of U.S. Provisional Patent Application No. 62/365,535, filed on Jul. 22, 2016, and titled "A Method to Capture, Store, Distribute, Share, Stream and Display Panoramic Image or Video," the entire contents of which are incorporated herein by reference in their entirety.

BACKGROUND OF THE INVENTION

Embodiments of the present invention are related to a method to capture, record, store, distribute, and share panoramic image or video. Instead of using a single processed image (e.g equirectangular image) representing the full captured environment, this method proposes to use the original native images captured by the device to represent panoramic image or video. This method maintains the optimal image quality, allows higher image compression ratio, requires lower processing and power consumption on capture devices, lower processing power, enables real time streaming and real time immersive rendering on display devices and/or cloud servers.

Panoramic images or videos is commonly used to represent a wide field of view scene on a digital format. They are created by processing together multiple images coming from multiple camera modules or a single camera module, pointing in different directions. This processing combines stitching and image projection algorithms. Different projections, including cylindrical, equidistant cylindrical, equirectangular, cube map, pyramid map, and etc., are commonly used to represent the wide field of view image contents up to a 360°×360° field of view scene into a panoramic image as claim in European Patent No. EP 2031561 A1 and European Patent No. EP 1909226 B1. Currently, panoramic images or videos are stored, distributed, and shared in these specific projected formats as preprocessed images. Those projections transform the original image contents, adding extra processing in the pipeline compared with usual image on video processing pipeline embedded in narrow angle capture devices. Many panoramic image capture devices process the native image to create these projected panoramic images or videos, including Ricoh Theta, 360FLY, Samsung Gear 360, Allie cam, Nokia OZO, Giroptic and Kodak SP360. Some devices, like Ricoh Theta, also save original captured images of multiple cameras on the device when they record video. However these original images videos are always stored locally. When users decide to distribute and share the panoramic images or videos, these contents are processed, stitched and projected to the said projected format. U.S. Pat. Nos. 6,002,430 A and 6,795,113 B1 proposed to convert two hemispherical images as a 'seamless spherical image'. Although these patents did not specify the method to create the 360°×360° image, they defined the image as a special format, and some special processing has to be applied to create the image from one or multiple images. Existing panoramic content or virtual reality (VR) content sharing websites and VR and immersive viewing application support as input format specific projection formats. For example, YouTube, Facebook, Deep Inc Liquid Cinema only support equirectangular projection. Some VR or panoramic player apps such as QuickTime VR, PT Viewer, KR Pano, ImmerVision Pure Player support more projection formats such as dome, equirectangular, cylinder, cube map, etc. Those formats are not the original image format captured by the devices (image projected by the lens on the sensor). These projection conversions include unnecessary image processing (projection conversion) on the capture device or application, and degrade the image quality of the original image. They are mainly used because those projections are the former formats developed since Marinus of Tyre and Ptolemy.

One common 360° panoramic capture device is back to back cameras as proposed by U.S. Pat. No. 6,002,430 A and miniaturized in U.S. Pat. No. 8,730,299 B. The device embeds two wide-angle lenses, with a field of view (FoV) larger than 180°, capturing front and back images, and each image contains about a half sphere FoV (~180°×360°). These two images are captured from wide angle lenses, fisheye lenses, or panomorph lenses. The resulting panoramic image is created by stitching and projecting these two images together. Ricoh Theta, Samsung Gera 360 and Allie cam produce this kind of output. As mentioned before, a projected panoramic image, such as equirectangular projected image, is created from one or more images and then stored, distributed, and shared in this projected format. To create the projected panoramic image, the processing applied rearranges the pixels of the original images, modifies the distortions, and projects each original image pixels onto a resulting image pixel. This process includes some pixel manipulations and interpolations that degrade the image sharpness and original quality and modify the pixel density in certain areas. In some areas of the field of view, the pixels are stretched to cover more pixels in the resulting image than in the original image. This process does not create more information and reduces the image quality by pixel interpolation. In some other areas, the pixels are compressed compared to the original image, reducing the pixel density (pixel per FoV angle), then reducing the image resolution, sharpness and quality. For example, for an equirectangular projection, the nadir and zenith areas of the full spherical field of view are highly stretched, and there are extensive image content redundancies in these areas. Although an image compression algorithm can reduce some redundancies, image file size is still increased by this projection, and this is not preferred in some resource sensitive cases, such as network sharing and live streaming. In addition to the image quality deterioration, this projection processing consumes a significant amount processing power on the capture device or where device control application is running. On most panoramic capture devices, this projection cannot be done in real-time due to CPU, GPU and battery limitations. If this projection is done by post-processing, it prevents real-time display, live streaming or instantaneous sharing. Using distant server or cloud computing to perform projection processing could be an option but does not eliminate the latency and the image deterioration associated to this process and there are significant costs related to this type of cloud computing. US Patent Application Publication No. 2015/0281507 A1 proposes to automatically define the system behavior or user experience by recording, sharing, and processing information associated with an image. The patent application shows how to use markers on an image to record different information associated to the image or multiple images coming from a capture device (imager). This method provides a convenient way to synchronize, store, distribute, and share metadata with original image content. Although this patent application mentions that the multiple-marked image can be stitched together later, there is no specific disclosure of an efficient image assembly method described in that invention.

To overcome all the previously mentioned issues, embodiments of the current invention propose a method to capture, record, stream, share and display panoramic image or video by reducing as much as possible the image processing related to projection and stitching to maintain the image quality and optimize the full process to be executed in real time on low power devices.

BRIEF SUMMARY OF THE INVENTION

In one aspect, the present invention is a system for capturing and assembling panoramic image data having a panoramic image capture device with image assembly parameters and configured to capture image content data, an encoding device coupled to the panoramic image capture device and configured to combine the image content data and the image assembly parameters into a panoramic image file, and a decoding device configured to receive the panoramic image file and assemble, based on the image assembly parameters, at least a portion of the image content data into an output image.

In another aspect, the present invention is a method for capturing and assembling panoramic image data including the steps of capturing image content data using a panoramic image capture device having image assembly parameters, encoding the image content data and the image assembly parameters into a panoramic image file, and assembling at least a portion of the image content data into an output image based on the image assembly parameters.

In another aspect, the present invention is a method for receiving and assembling panoramic image data including the steps of receiving a panoramic image file that includes image assembly parameters and image content data, and assembling, based on the image assembly parameters, at least a portion of the image content data into an output image.

In another aspect, the present invention is a panoramic imager having a panoramic image capture device with image assembly parameters, the panoramic image capture device configured to capture image content data, an encoding device electrically coupled to the panoramic image capture device configured to encode the image content data and the image assembly parameters into a panoramic image file, and a decoding device configured to receive the panoramic image file and assemble, based on the image assembly parameters, at least a portion of the image content data into an output image.

In another aspect, the present invention is a system for assembling panoramic images of a scene captured by a panoramic image capture device having a decoding unit configured to read image content data from the image capture device, an information reading unit configured to extract device parameters about the capture device, and an image processing unit configured to assemble an output image using the image content data and the device parameters.

In another aspect, the present invention is a method for automatically assembling different images captured by a panoramic image capture device, including the steps of receiving image content data, receiving device parameters about the capture device, and generating an output image using the image content data and the capture parameters.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 shows an example of the native panoramic image or video represented by two original circle images.

FIGS. 4A and 4B show how pixel density (pixel/degree of FoV) is lost in a projected panoramic image compare to the native panoramic image.

FIG. 7 shows how the Panoramic Image Processing Unit of FIGS. 6A and 6B dewarps and assembles the native panoramic images using the parameters or metadata.

FIG. 8 shows the full method of one embodiment of the present invention from capture, sharing/streaming and display.

DETAILED DESCRIPTION OF THE INVENTION

Figure 2:
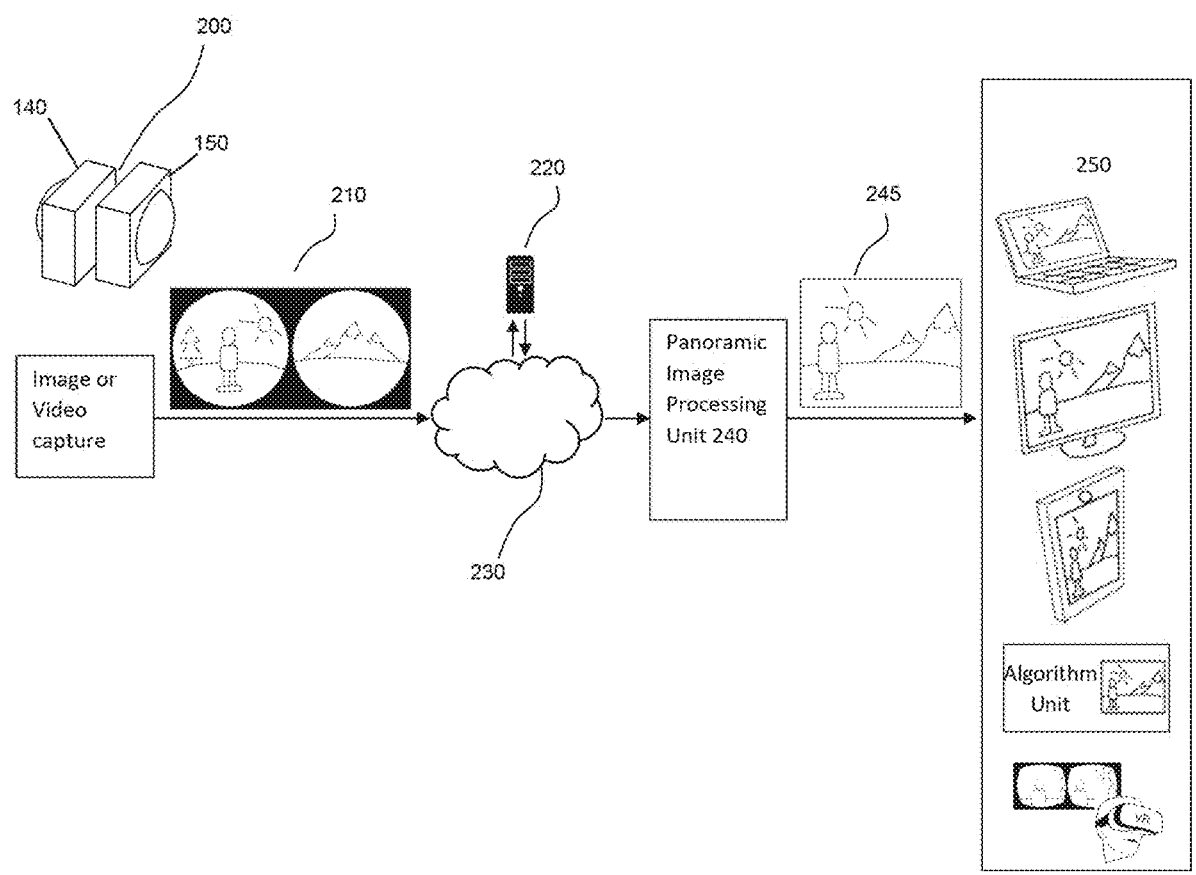
FIG. 2 shows an example of a method to store, distribute, and share panoramic image or video using two original circle images combined into a native panoramic image.

Certain terminology is used in the following description for convenience only and is not limiting. Unless specifically set forth herein, the terms "a", "an" and "the" are not limited to one element but instead should be read as meaning "at least one". The words "right," "left," "lower," and "upper" designate directions in the drawings to which reference is made. The words "inwardly" or "distally" and "outwardly" or "proximally" refer to directions toward and away from, respectively, the geometric center or orientation of the device and instruments and related parts thereof. The terminology includes the above-listed words, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

FIG. 1 shows an example of the native panoramic image or video represented by two original circle images. Circle images 100 and 110 are original images captured by front camera 140 and back camera 150, respectively, of panoramic image capture device 160. Both cameras are wide-angle cameras, producing circle images 100 and 110 with distortion and FoVs are equal or bigger than 180°. These cameras could be fisheye, panomorph, or any other type of wide-angle cameras. This way, these two circle images 100 and 110 cover 360°×360° space. In the case of native panoramic video, each frame contains two circle images 100 and 110 from front and back cameras 140 and 150. This embodiment with exactly 2 cameras is only an example and does not limit the scope of the present invention. We can alternatively consider capture devices with more than 2 cameras, with FoV lower than 180°, with an original image shape different than a circle, and/or different distortion (pixel density or pixel/degree). Alternatively, we can also consider capture devices with only one camera module capturing images in multiple directions. In this case, the orientation or the position of the camera module vary in time to capture several native panoramic images and the orientation and position of the camera comprise part of the image assembly information.

Referring now to FIGS. 1-2, the circle images 100 and 110 are the original images from the image capture device 160. The image capture device 160 can be configured to combine front and back camera original images 100 and 110 side by side to create the native panoramic image 210 or can output the original images in separated streams. The panoramic image capture device 160 does not consume strong processing power to perform this task because no processing is performed to stitch the two images 100, 110 together. The native panoramic image 210 can be recorded or streamed in real-time without post-processing. This also preserves the original image quality and pixel density. In addition, original images 100 and 110 can be recorded or streamed with no pixel manipulations or some image quality enhancement can be applied such as but not limited to white balance, exposure, sharpen, and de-noise. In this way the image quality of the original content captured is not degraded by any pixel resampling or interpolation processing.

Special lens or camera module features or benefits from the original images 100, 110 are preserved in native panoramic image 210. For example, but in no way limiting, a panomorph lens can create special non-linear distortion to magnify or increase the pixel density in some areas of the field of view. This feature is preserved in native panoramic image 210. This way, the panoramic image 210 or video display device 250 processing and displaying the native panoramic image or video has better resolution in those magnified areas. This magnification feature is not preserved be preserved in projected panoramic image or video such as equirectangular projected image or the like.

In native panoramic image 210, no pixel repetition or redundancies are introduced by projection processing. When a black background area is visible around the image circle, it can be ignored or efficiently compressed by image or video compression algorithms such that the file containing the native panoramic image 210 does not store data for those parts of the image 210 outside the image circles 100, 110.

Referring again to FIG. 2, there is shown a method to store, distribute, share and display native panoramic image or video 210. This embodiment shows two original circle images in the native panoramic image 210, but the native panoramic image 210 is not limited to two original circle images. In this case, the native panoramic image or video 210 is captured by the front and back cameras 140, 150 of panoramic capture device 200. The native panoramic image or video 210 can be saved in storage 220, and/or distributed, streamed and/or shared by media file or network 230. The native panoramic image 210 can then be shown on panoramic image or video display devices 250, on which Panoramic Image Processing Unit 240 process the native panoramic image or video to create and displayed view 245. Panoramic image or video display devices 250 can include, but are not limited to, image or video sharing web sites, televisions, laptop computers, or smartphones.

Figure 3:
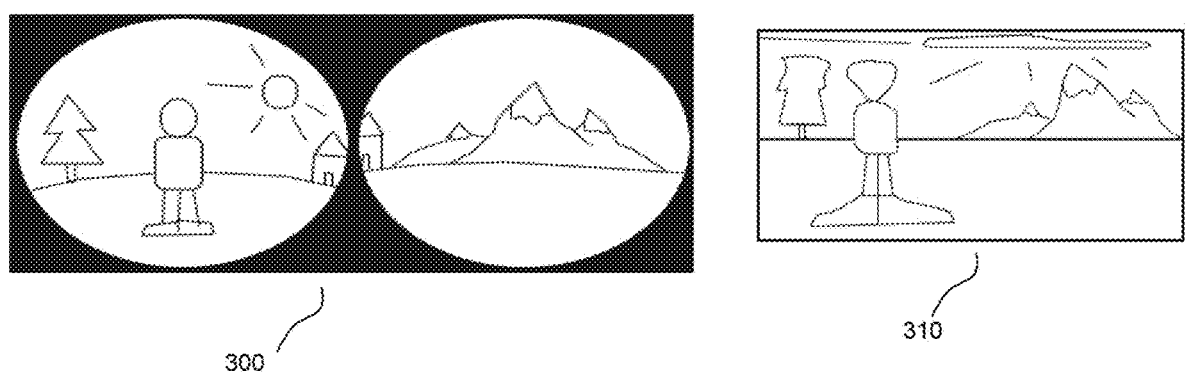
FIG. 3 shows an example of the native panoramic image proposed in the invention and a projected panoramic image representing the same 360°×360° field of view scene.

Referring now to FIG. 3, there is shown a comparison between the native panoramic image 300 and projected panoramic image 310. In a projected panoramic image with equirectangular projection, the nadir and zenith are highly stretched in the projected panoramic image with equirectangular projection 310 compared with the native panoramic image with two elliptical images 300. The projected panoramic image 310 contains significant pixel redundancies, which increases image file size. In the panoramic image with equirectangular projection 310, some areas are stretched, and some areas are squeezed introducing pixel resampling and interpolation processing in these areas. This processing degrades the overall image quality.

Figure 4B:
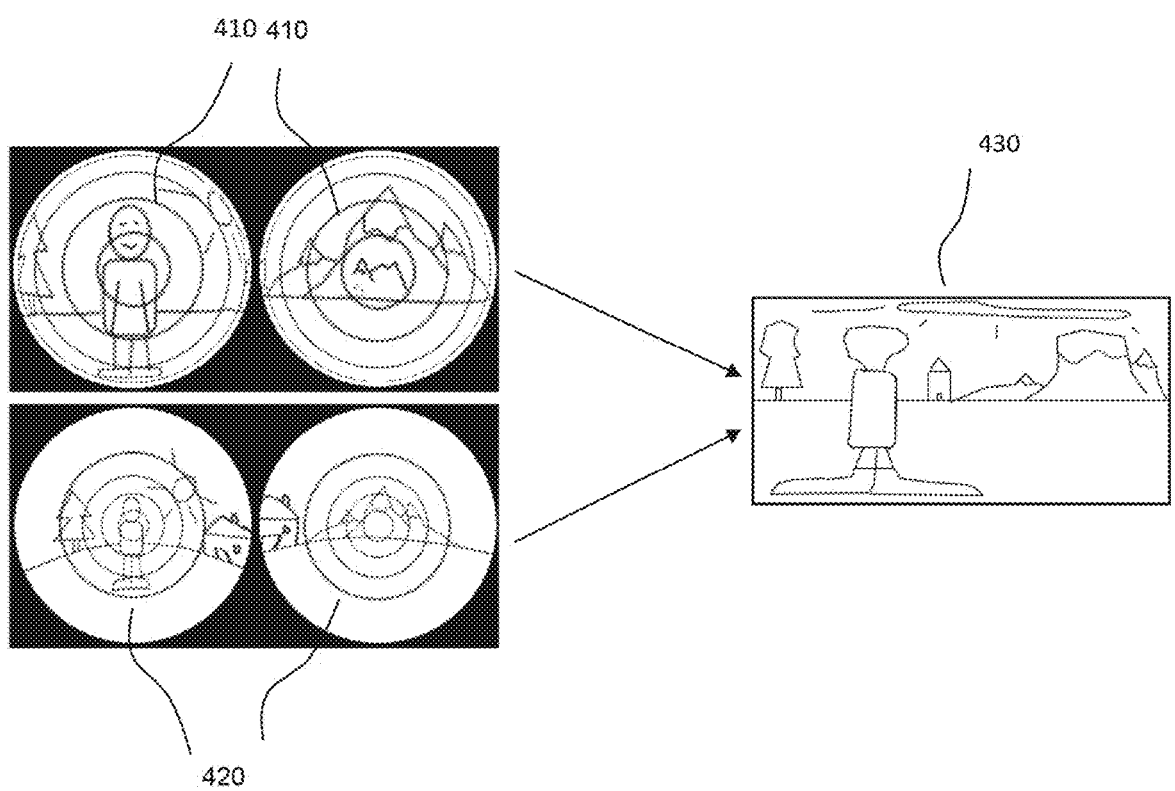

Referring now to FIG. 4, an example is shown to explain how a specific image resolution feature is preserved in the native panoramic image 400 compared to projected panoramic image 430. The original circle images 410, 420 from the capture device 160 are saved in panoramic image 400. The circle images 410, 420 are created by panomorph lenses and have some magnification areas in certain areas of the lens field of view. For example, but in no way limiting, the left circle image 410 has a magnified area in the center of the field of view, and the right circle image 420 has a magnified area at the periphery of the field of view 420. The Panomorph lenses on panoramic image capture device 160 are designed to create higher resolution or pixel density in these areas. These areas are magnified (increase of pixel density) for specific purposes such as image quality or user experience. The native panoramic image 400 preserved the pixel density repartition and final displayed image retain the higher resolution in these areas. In contrast, the pixel density is changed in the projected panoramic image 430. For example, in equirectangular projection 430 some areas of the field of view reduce the native pixel density, and some areas have pixel redundancies. The non-linear pixel density characteristic of the panomorph lenses is removed by the projected panoramic image 430 and the lost image data can only be restored to circle images 440 by reprocessing the equirectangular projected panoramic image 430. FIG. 4B further shows that any type of original images, with their specific magnification in the center 410 or at the periphery 420, from the capture device 160 equipped with panomorph lens can be converted in the same equirectangular projected panoramic image 430, losing the benefits of certain magnifications areas in the native images 410, 420.

Figure 5:
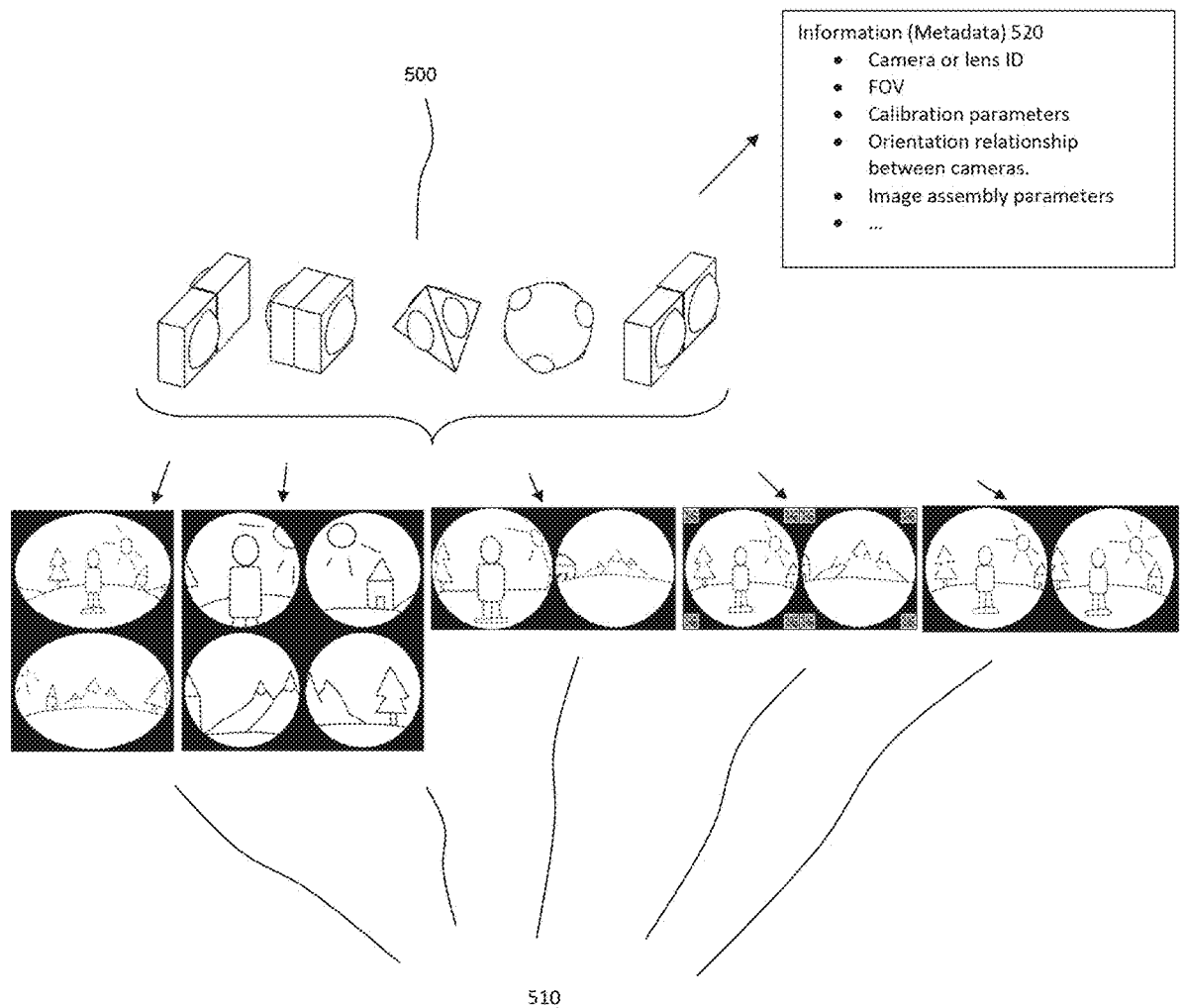
FIG. 5 shows multiple examples of Panoramic Image or Video Capture Devices generating different types native of panoramic images or videos.

FIG. 5 shows multiple examples of Panoramic Image or Video Capture Devices 500 generating different types of native panoramic images or videos 510 and their associated set of information, metadata, image parameters, or imager parameters 520. The native panoramic images or videos 510 can be composed by two or more original images coming from the different camera modules embedded inside the panoramic capture devices 500, such as that shown in FIG. 1. The camera modules are not necessarily wide-angle camera modules, and the different original images can have any shape such as but not limited to circle, ellipse, section of circle, section of ellipse, rectangle, etc. These camera modules can be any image capture devices such as fisheye, panomorph, wide-angle, traditional narrow angle, light field or plenoptic camera modules. These full capture coverage is not limited to the 360°×360° field of view scene but could be a section of the 360°×360° field of view scene and can include overlap and/or stereo capture areas for image assembly, stitching, 3D reconstruction, 3D stitching. In some embodiments of the present invention, exactly 2 camera modules are used in a generally back-to-back configuration, as shown in FIG. 1, or in a generally side-by-side configuration (stereoscopic). Here, the term generally is meant to also include configurations that have some angular deviation from perfect back-to-back or perfect side-by-side configurations due to either alignment or tolerance error or to angular deviation added to extend the field of view or the overlapping region with these configuration. The information, metadata, image parameters, or imager parameters 520 describing the capture device can include, but are not limited to, Camera or lens ID, FoV, Calibration parameters, Orientation relationship between cameras, Image assembly information, and mechanical arrangement. The parameters 520 can be outputted by the devices 500 separate from the image data or within the image data, written inside markers as described in US Patent Application Publication No. 2015/0281507. Such markers can be, for example, a QR Code, which can be pasted on the panoramic image 510 and includes all the necessary parameters 520 for processing.

Figure 6A:
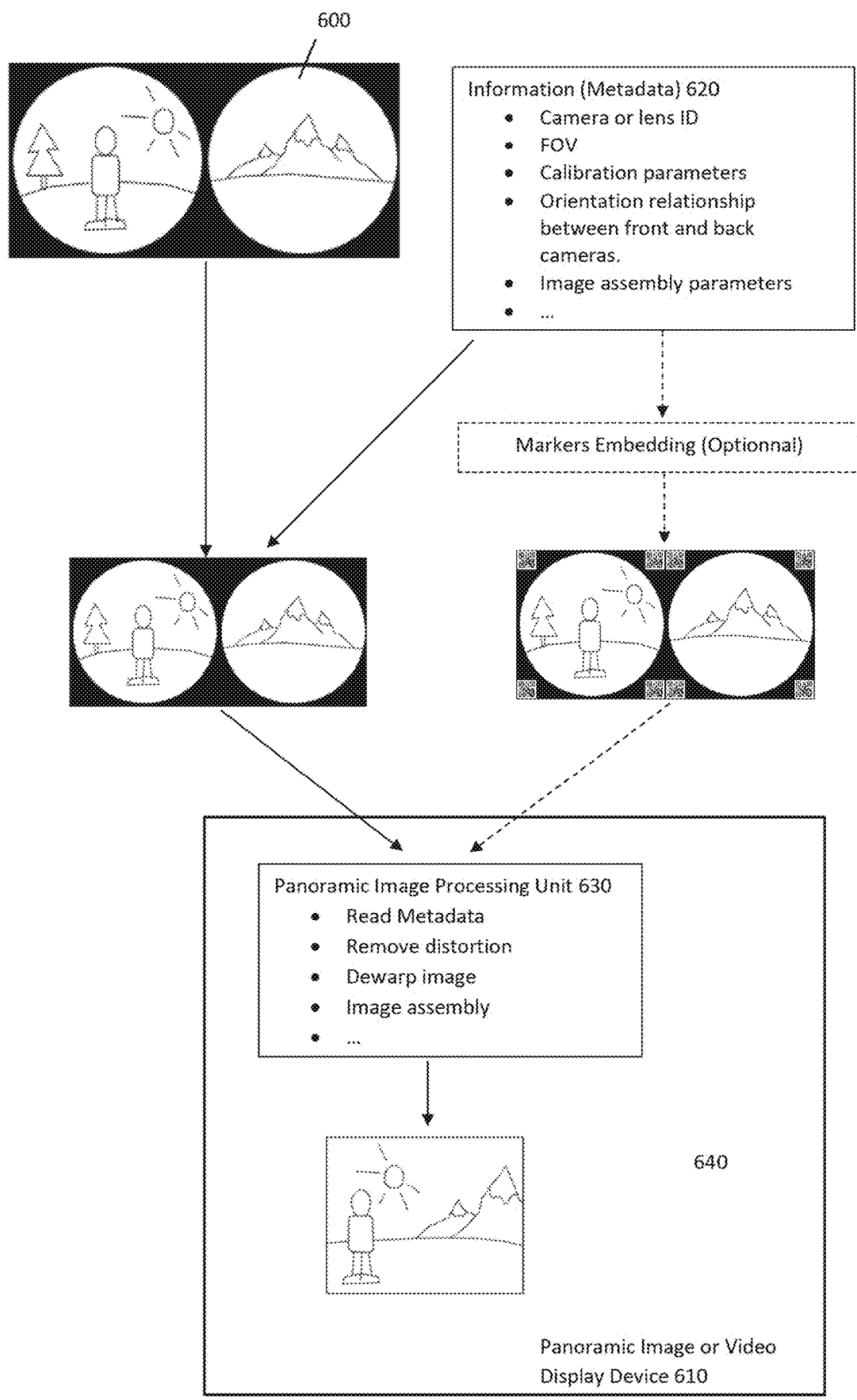
FIGS. 6A and 6B show how a Panoramic Image Processing Unit assembles multiple dewarped images from the native panoramic image using parameters or metadata about the images and image capture devices.

FIG. 6A shows how the native panoramic image 600 is processed by a panoramic image or video display device 610 according to associated parameters (metadata) 620 using a Panoramic Image Processing Unit 630 to generate the display image 640. The process can include, but is not limited to, reading the parameters 620, extracting necessary parameters 620 from the entire set of parameters 620, dewarping the image 610, modifying distortion, and assembling the multiple images 610 into one image 640. The different steps can be done in any order and can be performed sequentially, simultaneously, and/or in parallel. The parameters (metadata) 620 can include, but are not limited to, camera or lens ID, the orientation relationship between multiple cameras, camera calibration parameters, and image assembly or stitching information. The parameters 620 can be separate from the image data or within the image data written inside marker as described in US Patent Application Publication No. 2015/0281507.

Figure 6B:
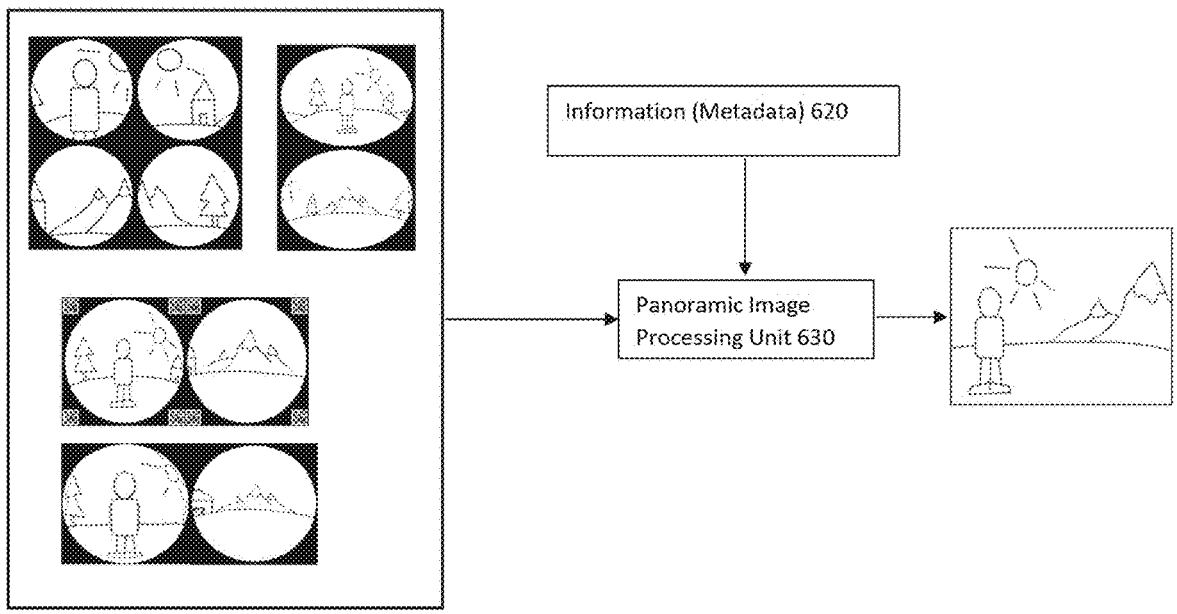

The Panoramic Image Processing Unit 630 can process any type of native image 600 and associated parameters (metadata) 620 from any type of Image or Video Capture Device 610 as shown in FIG. 6B.

FIG. 7 shows algorithm or process applied on the images 710, 720. The Panoramic Image Processing Unit 630 extracts only the parts from the native panoramic images 710 and 720 required for the assembled image 760. The Panoramic Image Processing Unit 630 can process distortion from a section of the images 710, 720 using a distortion curve corresponding to the capture device lens using the parameters (metadata) 620. The Panoramic Image Processing Unit 630 adjusts the position and orientation of the dewarped images 730 and according to the parameters (metadata) 620. The parameters 620 can include, but are not limited to, lens ID, FoV, calibration parameters, position and orientation relationship between different camera modules, and mechanical arrangement of the device especially part visible in the field of view of at least one camera. In some embodiments of the present invention, some of parameters 620 can be configured inside a camera using a specific calibration bench or setup used to define the relative position and orientation between the multiples cameras 140, 150. In other embodiments of the present invention, the parameters 620 can use device sensors like gyroscope, accelerometer or magnetometer to define the relative position and orientation between the multiple cameras 140, 150. The Panoramic Image Processing Unit 630 blends or stitches the overlap area 750 of the dewarped images 730, 740. This step can be limited to a simple pixel rearrangement and blend, up to a smart adaptive image assembly process using the attribute of the object present in the overlap area 750 defined for example in the metadata 620 or extracted from the images 730, 740. This could include, for example, a different processing depending on the distance of the objects from the cameras 140, 150 to correct parallax error. The Panoramic Image Processing Unit 630 can further process the dewarped images 730 and 740 to minimize the differences inside and around the overlap area 750, including by correcting geometrical shapes, remapping some pixels for better image continuity between the 2 images 730, 740, color and brightness correction to adjust the remaining differences, or adjust the mesh for more uniform assembly. This process can be done in a GPU to leverage 3D accelerated rendering and pixel shaders for pixel manipulation. Also, since the number of pixels manipulated is much smaller compared to the projected panomorph image calculation of the prior art, this process is more efficient and can run in real time on low power devices.

FIG. 8 shows one embodiment of the complete method from the capture device 160 to the display device 250, including content capture, recording, sharing, streaming and display. The original images 801, 802 are captured by the camera module 800. The Image Signal Processing unit 810 processes the original images 801, 802 and performs usual image signal processing that can include, but is not limited to, white balance, exposure control, de-noise, color correction, or sharpening. Those processing steps can be adapted using the statistic values coming from the different original images 801, 802 to minimize variances in image attributes such as exposure, white balance, and color. The original image capture process is also synchronized and the multiple images 801, 802 can be assembled in the same native panoramic image 820. The information (metadata) 830 and native panoramic image 820 are combined by encoding unit 850 into a single file or can be saved or separately, or written in markers stamped on image as claimed in the US Patent Application Publication No. 2015/0281507 A1. The encoding unit 850 may simply write the information (metadata) 830 and native panoramic image 820 into a file or may perform more intensive tasks such as compressing or encrypting the resulting file. This native panoramic image or video capture process is efficient and can run in real time on low power devices. The captured content can be stored, distributed, shared, or streamed in real time through different media, network, cloud or locally.

A Decoding Unit 860 then receives, reads and decodes the content live or at a later time and extracts the native panoramic images 820. The associated information 870 is either received separated from the native image content file 820 or received directly from the native panoramic image as metadata 830 or read from the markers in the native panoramic image 820 as claimed in the US Patent Application Publication No. 2015/0281507. An Immersive Display 880 then displays the assembled images or videos together as dewarped and assembled as described in FIG. 6 and FIG. 7.

In some embodiments of the current invention, the display unit 250 communicates to the panoramic image capture device 160 which part of the native panoramic image 210 is being assembled and displayed. Using this information, the panoramic image capture device 160 can modify the image capture method to increase the resolution, image quality, or frame rate in this part of the panoramic image 210 to be displayed. The panoramic image capture device 160 could also pass this information to the cameras 140, 150 to further minimize enhance the required part of the native images 210, including the overlap area 750.

This overall process reduces the image pixel processing related to projection assembly and stitching algorithm to maintain the original captured image quality. This process also reduces the chipset and power consumption, allowing it to be executed real time on low power devices.

Figure 9:
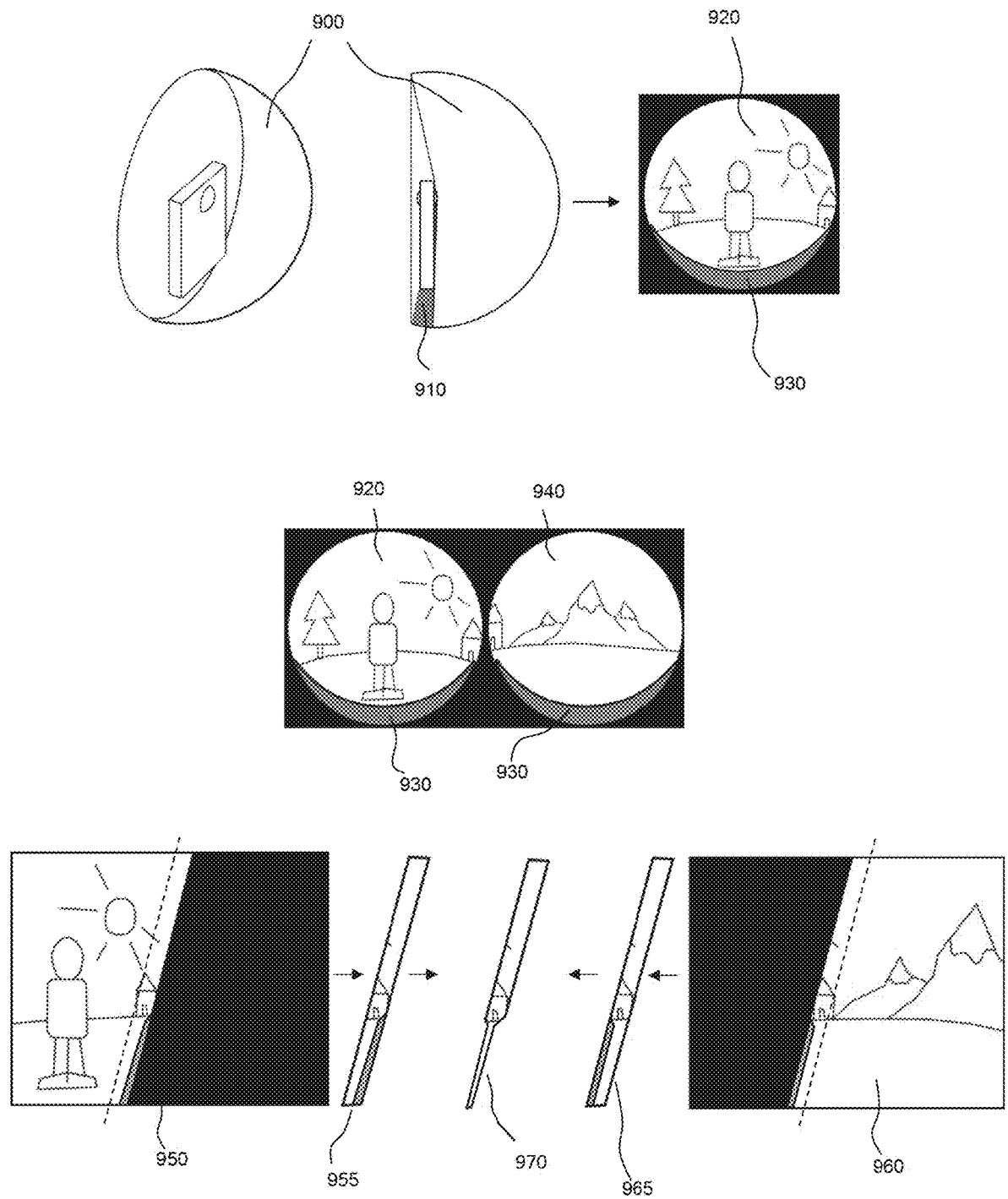
FIG. 9 shows another embodiment wherein the image assembly information further contains mechanical information about the device visible inside the image field of view.

FIG. 9 shows an embodiment according to the present invention wherein the parameters 620 further contain information about the portion of the surface 900 of the mechanical casing of the device 160 visible inside the image field of view. The panoramic surface captured by the front camera 900 is partly obstructed by the device itself and region 910 of the panoramic surface is outside the field of view of the camera. The resulting circle image 920 captured by the front camera has a part 930 of the image 920 where the casing of the device 900 is visible, obscuring the view of the area surrounding the device. Similarly, the resulting circle image captured by the back camera 940 also has a part 930 of the image where the casing of the device 900 is visible, again obscuring the view of the area surrounding the device. In addition to casing 900, this could also include other mechanical parts obscuring part of the view, including a tripod or hands of a user holding the device. By writing the information of which part of the images are from the mechanical casing of the device 900 in the parameters 620, the image processing unit 630 can remove this part of the image 930 from the dewarped image from front camera 950 and from the dewarped image from back camera 960 during processing, allowing the image processing unit 630 to combine the overlap regions 955 and 965 from the front and back images 950 and 960 into the overlap region 970 without the casing 900 being visible. Since after removing the casing 900 from the images, the processed overlapping area 970 is not of constant size across the images, the algorithm can adaptively adjust the image assembly width to use more pixels in the part where larger overlapping area is available and less pixels when thinner overlapping area is available. Compared to a device where an equirectangular projection is done inside the device, the present invention retains all the information inside the native panoramic image 920, 940 and allows the immersive display device to remove it.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the present disclosure.

We claim:

1. A system for capturing and assembling panoramic image data, the system comprising:
   (a) a panoramic image capture device having image assembly parameters, the panoramic image capture device configured to capture image content data, the image content data including two images taken from different perspectives, each image having an overlap region such that when the two images are combined the overlap regions form an overlapping area, at least one of the two images having its overlap region partially obscured within an image field of view, the image assembly parameters containing at least information about the obscured part of the image field of view;
   (b) an encoding device coupled to the panoramic image capture device, the encoding device configured to combine the image content data and the image assembly parameters into a panoramic image file; and
   (c) a decoding device configured to receive the panoramic image file and assemble, based on the image assembly parameters, at least a portion from each of the two images into an output image, an image assembly width of the overlapping area being adjusted using the image assembly parameters.

2. The system of claim 1, wherein the panoramic capture device comprises a plurality of camera modules configured to capture the image content data from multiple perspectives.

3. The system of claim 2, wherein at least two of the plurality of camera modules are in a generally back-to-back configuration.

4. The system of claim 2, wherein at least two of the plurality of camera modules are in a generally side-by-side configuration.

5. The system of claim 2, wherein the panoramic image capture device further comprises an image processing unit configured to synchronize data from the plurality of camera modules.

6. The system of claim 1, wherein the image assembly parameters further comprise at least the relative position and orientation of the capture device.

7. The system of claim 1, wherein the panoramic image capture device comprises an image processing unit configured to reduce differences between different images captured in multiple directions.

8. The system of claim 7, wherein the image processing unit in the panoramic capture device uses at least one of the image assembly parameters to evaluate differences between the different images.

9. The system of claim 1, wherein the panoramic capture device comprises a camera module configured to capture the image content data from multiple perspectives.

10. The system of claim 1, wherein the decoding device selectively assembles multiple portions of the image content data into the output image using the image assembly parameters.

11. The system of claim 1, wherein the panoramic image capture device captures multiple original images and combines the multiple original images in the image content data.

12. The system of claim 1, wherein the image assembly parameters are encoded with at least one marker to create at least one marked image.

13. The system of claim 1, wherein the image content data and at least some image assembly parameters are captured in real time.

14. The system of claim 1, wherein the image assembly parameters further comprise at least one of an orientation of the capture device, a scene image content position, an orientation of the image content data, a size of an image, a speed of the panoramic image capture device, an acceleration of the panoramic image capture device, a distance of an object from the panoramic image capture device, and information of the mechanical parts of the image capture device visible inside the image field of view.

15. The system of claim 1, wherein the panoramic image capture device comprises a wide-angle camera module.

16. A method for capturing and assembling panoramic image data, the method comprising:
   (a) capturing, using a panoramic image capture device having image assembly parameters, image content data, the image content data including two images taken from different perspectives, each image having an overlap region such that when the two images are combined the overlap regions form an overlapping area, at least one of the two images having its overlap region partially obscured within an image field of view, the image assembly parameters containing at least information about the obscured part of the image field of view;

(b) encoding the image content data and the image assembly parameters into a panoramic image file; and (c) assembling, based on the image assembly parameters, at least a portion from each of the two images into an output image, an image assembly width of the overlapping area being adjusted using the image assembly parameters.

17. A method for receiving and assembling panoramic image data, the method comprising:

(a) receiving a panoramic image file, the panoramic image file including image assembly parameters and image content data, the image content data including two images taken from different perspectives, each image having an overlap region such that when the two images are combined the overlap regions form an overlapping area, at least one of the two images having its overlap region partially obscured within an image field of view, the image assembly parameters containing at least information about the obscured part of the image field of view; and (b) assembling, based on the image assembly parameters, at least a portion from each of the two images into an output image, an image assembly width of the overlapping area being adjusted using the image assembly parameters.

18. A panoramic imager comprising:

(a) a panoramic image capture device having image assembly parameters, the panoramic image capture device configured to capture image content data, the image content data including two images taken from different perspectives, each image having an overlap region such that when the two images are combined the overlap regions form an overlapping area, at least one of the two images having its overlap region partially obscured within an image field of view, the image assembly parameters containing at least information about the obscured part of the image field of view;

(b) an encoding device electrically coupled to the panoramic image capture device, the encoding device configured to encode the image content data and the image assembly parameters into a panoramic image file; and (c) a decoding device configured to receive the panoramic image file and assemble, based on the image assembly parameters, at least a portion from each of the two images into an output image, an image assembly width of the overlapping area being adjusted using the image assembly parameters.

19. The panoramic imager of claim 18, wherein the decoding device is further configured to communicate to the panoramic image capture device which part of the native panoramic images are displayed.

20. The panoramic imager of claim 18, further comprising:

(d) a decoding device configured to communicate to the panoramic image capture device information computed during the image assembly.

* * * * *